United States Patent
Bottner et al.

(10) Patent No.: US 10,859,416 B2
(45) Date of Patent: Dec. 8, 2020

(54) STATIC FLOW METER

(71) Applicant: Itron Global SARL, Liberty Lake, WA (US)

(72) Inventors: Michel Bottner, Liberty Lake, WA (US); Daniel Catherin, Liberty Lake, WA (US); Stephane Hyvernat, Liberty Lake, WA (US); Anthony Renoud, Liberty Lake, WA (US)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 16/230,434

(22) Filed: Dec. 21, 2018

(65) Prior Publication Data
US 2019/0195671 A1 Jun. 27, 2019

(30) Foreign Application Priority Data
Dec. 22, 2017 (EP) .................................... 17210403

(51) Int. Cl.
*G01F 1/66* (2006.01)
(52) U.S. Cl.
CPC .............. *G01F 1/667* (2013.01); *G01F 1/662* (2013.01)
(58) Field of Classification Search
CPC ....................................................... G01F 1/66
See application file for complete search history.

(56) References Cited

U.S. PATENT DOCUMENTS

| | | | | |
|---|---|---|---|---|
| 6,640,627 B2 * | 11/2003 | Sato | ........................ | G01F 1/684 73/204.22 |
| 6,820,480 B2 * | 11/2004 | De'Stefani | ............ | G01F 1/6965 73/204.18 |
| 7,360,414 B2 * | 4/2008 | Konzelmann | ......... | G01F 1/6842 73/202.5 |
| 7,437,925 B2 * | 10/2008 | Ban | ....................... | F02D 41/187 73/202.5 |
| 2004/0003659 A1 * | 1/2004 | Kato | ..................... | G01F 1/6842 73/202 |
| 2007/0107533 A1 | 5/2007 | Molenaar et al. | | |
| 2015/0082880 A1 | 3/2015 | Allen | | |
| 2015/0377668 A1 | 12/2015 | Nielsen | | |
| 2016/0334251 A1 | 11/2016 | Otsu et al. | | |
| 2017/0146378 A1 | 5/2017 | Drachmann | | |

OTHER PUBLICATIONS

EP Communication pursuant to Article 94(3) EPC; dated Apr. 15, 2020; 5 pages.
EP Search Report dated Aug. 6, 2018; 9 pages.

* cited by examiner

*Primary Examiner* — Jewel V Dowtin
(74) *Attorney, Agent, or Firm* — Lee & Hayes, P.C.

(57) ABSTRACT

A sensor for measuring the flow rate of a fluid in a flow tube, the sensor comprising sensing means and a sensor body, wherein a portion of the sensing means is located within the sensor body and a first portion of the sensor body is arranged to fasten the sensor body to the flow tube such that the sensor is positioned for sensing the flow rate of the fluid in the flow tube.

16 Claims, 6 Drawing Sheets

STATIC FLOW METER

FIELD

The disclosure relates to a, and components of a, flow meter assembly for measuring the flow rate of a fluid in a flow tube.

BACKGROUND

Fluids and, in particular, water, are supplied to homes and businesses around the world. The metering of these fluids is important for many reasons: from monetary reasons—so that the amount of water supplied to a consumer can be correctly measured and billed for; to security of supply reasons—so that leaks can be quickly detected and resolved.

One approach to metering is to use static meters. Static meters are meters which, in comparison to mechanical meters, have no moving parts. Instead, static meters make use of technologies such as electromagnetism or ultrasound to measure flow rates. Advantageously, static meters are more accurate than their mechanical predecessors, particularly at low flow rates. Low flow rates may be flow rates which are below 10 litres per minute, for example. Low flow rates may be experienced if there is a leak or blockage upstream of the meter, or if the water pressure has dropped. Additionally, due to the absence of moving parts, static meters are more reliable than their mechanical predecessors.

However, static meters require a power supply. This is because power is needed to operate the flow measurement technologies, such as ultrasound, utilised in static meters. Improvements in battery technology mean that batteries are capable of supplying the power needed by a static meter for up to, and in some cases in excess of, 20 years. Advantageously, this means that static meters may be installed and used in position for 20 years.

To match the available battery power and maximise the potential lifespan of static meters, the metering industry is therefore under increasing pressure to design meters which are capable of being used—in position—for 20 years. In reality, this means providing meters which are capable of protecting the electrical components of the meter from moisture and foreign bodies (such as dirt) for 20 years. In particular, this means providing meters which meet Ingress Protection (IP) level 68 (IP68), as defined in international standard EN 60529.

One approach of meeting the IP68 standard is to house the electrical components in a dry cavity. The specific way in which the housing is arranged and fixed to the flow tube can however significantly affect whether or not the meter meets the IP68 standard, and indeed how well the meter performs.

One way of fixing a housing to a flow tube is shown in FIG. 1. FIG. 1 shows a cross section of a static meter assembly 100. The static meter assembly 100 comprises a flow tube 110 and a housing 120. In this example, the longitudinal axis of the flow tube 110 is orientated horizontally. The housing 120 sits on top of the flow tube 110. The bottom of the housing 120 is horizontally orientated.

The housing 120 comprises a membrane 121 and a lid 122. The lid 122 is sealably fastened to the membrane 121. The housing 120 contains electrical components 123 and ultrasonic transducers 124, 125. The ultrasonic transducers 124, 125 are provided in respective dimples 126, 127 of the membrane 121. The dimples 126, 127 of the membrane 121 are arranged to sit within respective openings 111, 112 of the flow tube such that the ultrasonic transducers are positioned for measurement of flow within the flow tube.

Although not shown, the housing 120 is fixed to the flow tube 110 by two brackets, each of which extends across the top of the lid 122, in a direction perpendicular to the direction of fluid flow in the flow tube 110 and perpendicular to the longitudinal axis of the flow tube 110, and down the sides of the membrane 121. Each bracket extends down the sides of the membrane 121 in line with, and either side of, a respective dimple 126, 127. Holes (not shown) are provided in the flow tube 110 at either side of each of the openings 111, 112. The holes in the flow tube line up with corresponding holes in the brackets. Screws are used to fix the brackets to the flow tube 110 via the holes.

While the static meter assembly 100 benefits from some of the advantages of static meters discussed above, there are drawbacks with this approach. First, due to the large number of holes formed in the flow tube 110, the likelihood of leakage from the flow tube 110 is increased. This is because each hole provides an additional potential point of failure. Not only are such leakages disadvantageous generally, but the leaked fluid may enter the housing 120 and spoil the meter. Second, the dimples 126, 127 and/or the ultrasonic transducers 124, 125 are vulnerable to being dislodged relative to the flow tube 110. For example, there may be a flow surge which knocks the dimples 126, 127 and/or the transducers 124, 125 out of position. If this occurs, the ultrasonic transducers 124, 125 will not be able to operate as intended. At best, this will result in a decrease in meter reliability; at worst, the meter will not be able to operate at all. Third, the dimples 126, 127 have to create a seal with the flow tube 110 to avoid fluid leaking from the flow tube 110. Consequently, the join between the dimples 126, 127 and the flow tube 110 is another potential point of failure.

SUMMARY

According to one aspect, there is provided a sensor for measuring the flow rate of a fluid in a flow tube, the sensor comprising sensing means and a sensor body, wherein: a portion of the sensing means is located within the sensor body; and a portion of the sensor body is arranged to fasten the sensor body to the flow tube such that the sensor is positioned for sensing the flow rate of the fluid in the flow tube.

The portion of the sensor body may be arranged to sealably fasten the sensor body to the flow tube.

The portion, or a further portion, of the sensor body may be arranged to fasten the sensor body to a housing.

The portion, or the further portion, of the sensor body may be arranged to sealably fasten the sensor body to the housing.

The housing may comprise signal converting means.

The portion of the sensor body may be threaded.

The portion of the sensor body may be arranged to threadably fasten to the flow tube.

The portion of the sensor body may be arranged to threadably fasten to a portion of a connection point of the flow tube.

The connection point may be a port.

The signal converting means may be arranged to apply an input signal to the sensing means and/or receive an output signal from the sensing means.

The signal converting means may be arranged to apply an input signal to the sensing means and receive an output signal from the or a further sensing means of a further sensor.

The signal converting means may be arranged to determine the flow rate of the fluid in the flow tube based on the input and output signals.

The signal converting means may comprise a printed circuit board (PCB), a processor and a memory.

The memory may comprise instructions executable by the processor to apply the input signal and receive the output signal.

The input and output signals may be electrical signals.

The memory may further comprise instructions executable by the processor to determine the flow rate of the fluid in the flow tube based on the input and output signals.

The housing may further comprise communication means.

The memory may further comprise instructions executable by the processor to send a message indicative of the flow rate of the fluid in the flow tube to the communication means.

The communication means may be arranged to send a message indicative of the flow rate of the fluid in the flow tube to a receiver external to the housing.

The signal converting means may be arranged to apply an input signal to the sensing means and receive an output signal from the sensing means.

The sensor may be a transceiver, a transmitter or a receiver.

The sensor may be a transducer.

The transducer may be a piezoelectric transducer.

The piezoelectric transducer may be an ultrasonic transducer.

The sensor may be positioned for sensing the flow rate of the fluid in a measurement tube arranged within the flow tube.

The sensor may be positioned for transmitting a signal towards and/or receiving a signal from a reflector arranged within or comprised in the measurement tube.

According to another aspect, there is provided at least two of the sensors, wherein one of the sensors is a transmitter and at least one other of the sensors is a receiver.

One of the sensors may be positioned for transmitting a signal towards a reflector in arranged within, or comprised in, the measurement tube and the at least one other of the sensors may be positioned for receiving the signal from a further reflector arranged within, or comprised in, the measurement tube.

Sensing means may comprise means for measuring or contributing to the measurement of the flow rate of the fluid in the flow tube.

Sensing means may comprise means for converting electrical signals to ultrasound.

The portion of the sensing means may be fixed to the sensor body.

The portion of the sensing means may be fixed to the sensor body by adhesion, shrink fit or welding.

The portion of the sensing means and the sensor body may be sealably fixed to each other.

A flow tube gasket may be arranged between the sensor body and the flow tube.

A housing gasket may be arranged between the sensor body and housing.

According to another aspect, there is provided a method of manufacturing the sensor, the method comprising: providing the sensor body and the sensing means.

The method may further comprise: fixing the portion of the sensing means to the sensor body.

The method may further comprise: providing screw threading on the portion of the sensor body.

The method may further comprise: providing screw threading on the further portion of the sensor body.

The method may further comprise: providing a lip on the sensor body.

The method may further comprise: providing a recess in the sensor body.

According to another aspect, there is provided a flow tube for transporting a fluid, the flow tube comprising: an inlet; an outlet; and a connection point, wherein a portion of the connection point is arranged to fasten the flow tube to a sensor for measuring the flow rate of the fluid in the flow tube such that the sensor is positioned for sensing the flow rate of the fluid in the flow tube.

The portion of the connection point may be arranged to sealably fasten the flow tube to the sensor.

The portion of the connection point may be threaded.

The portion of the connection point may be arranged to threadably fasten to the sensor.

The connection point may be a port.

The flow tube may further comprise a measurement tube.

The measurement tube may be arranged within the flow tube.

The measurement tube may be arranged to increase the velocity of the fluid in the flow tube.

The measurement tube may comprise a reflector.

The reflector may be arranged to direct a signal towards or away from the sensor.

According to another aspect, there is provided a method of manufacturing the flow tube body, the method comprising: providing the flow tube.

The method may further comprise: casting or fabricating the flow tube body as a single piece.

The method may further comprise: providing the inlet in the flow tube.

The method may further comprise: providing the outlet in the flow tube.

The method may further comprise: providing the connection point in the flow tube.

The method may further comprise: providing screw threading to the connection point.

The method may further comprise: providing the measurement tube.

According to another aspect, there is provided a flow meter assembly for measuring the flow rate of a fluid in a flow tube, the assembly comprising: a flow tube for transporting the fluid, the flow tube having an inlet, an outlet and a connection point; and a sensor for measuring the flow rate of the fluid, the sensor having sensing means and a sensor body, wherein a portion of the sensor body and a portion of the connection point are arranged to fasten the sensor body and the flow tube to each other such that the sensor is positioned for sensing the flow rate of the fluid in the flow tube.

The portion of the sensor body may be arranged to sealably fasten the sensor body to the flow tube.

The portion, or a further portion, of the sensor body may be arranged to fasten the sensor body to a housing.

The portion, or a further portion, of the sensor body may be arranged to sealably fasten the sensor body to the housing.

The housing may comprise signal converting means.

The signal converting means may be arranged to apply an input signal to the sensing means and/or receive an output signal from the sensing means.

The portions of the connection point and the sensor body may be threaded.

The portions of the sensor body and the connection point may be arranged to threadably fasten to each other.

The connection point may be a port.

The flow tube may further comprise a measurement tube.

The measurement tube may be arranged within the flow tube.

The measurement tube may be arranged to increase the velocity of the fluid in the flow tube.

The measurement tube may comprise a reflector.

The reflector may be arranged to direct a signal towards or away from the sensor.

According to another aspect, there is provided a method of assembling the flow meter, the method comprising fastening the portion of the sensor and the portion of the connection point to each other.

According to another aspect, there is provided a method of assembling a flow meter assembly for measuring the flow rate of a fluid in a flow tube, the assembly comprising: a flow tube for transporting the fluid, the flow tube having an inlet, an outlet and a connection point; and a sensor for measuring the flow rate of the fluid, the sensor having sensing means and a sensor body, wherein a portion of the sensor body and a portion of the connection point are arranged to fasten the sensor body and the flow tube to each other such that the sensor is positioned for sensing the flow rate of the fluid in the tube; and wherein the method comprises the step of: fastening the portion of the sensor and the portion of the connection point to each other.

BRIEF DESCRIPTION OF THE DRAWINGS

Exemplary arrangements of the disclosure shall now be described with reference to the drawings in which.

Throughout this specification, like reference numerals refer to like parts.

DETAILED DESCRIPTION OF THE DRAWINGS

Overview

A number of static flow meter assemblies are described in this disclosure. Common to each assembly is that the sensors in the assemblies play a key role in fastening the meter housings to the flow tubes to be measured. More specifically, the sensors are arranged to sealably fasten to both the flow tube and the housing. In this way, not only are the sensors used to measure the flow rate of the fluid in the flow tube, but the sensors are used to fasten the housing to the flow tube. As will be discussed in more detail below, this approach to fixing the housing to the flow tube has numerous benefits, including: reduced likelihood of leakages; improved structural integrity of the assembly; and more reliable and accurate positioning of the sensors.

Flow Meter Assembly

A flow meter assembly forming part of this disclosure will now be described in reference to FIG. 2.

Figure 1:
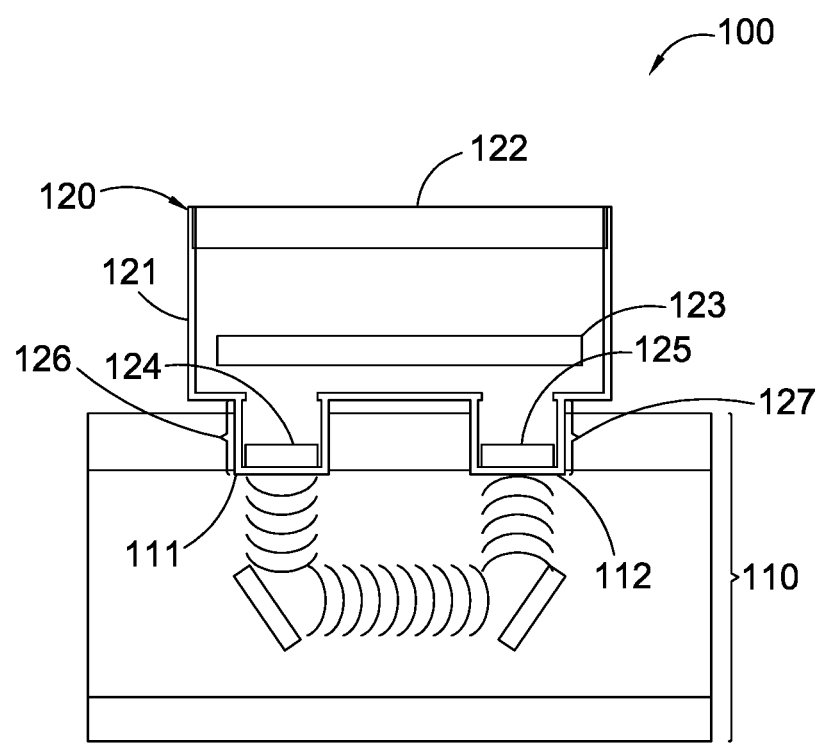
FIG. 1 shows a comparative example of a static meter assembly.
Figure 2:
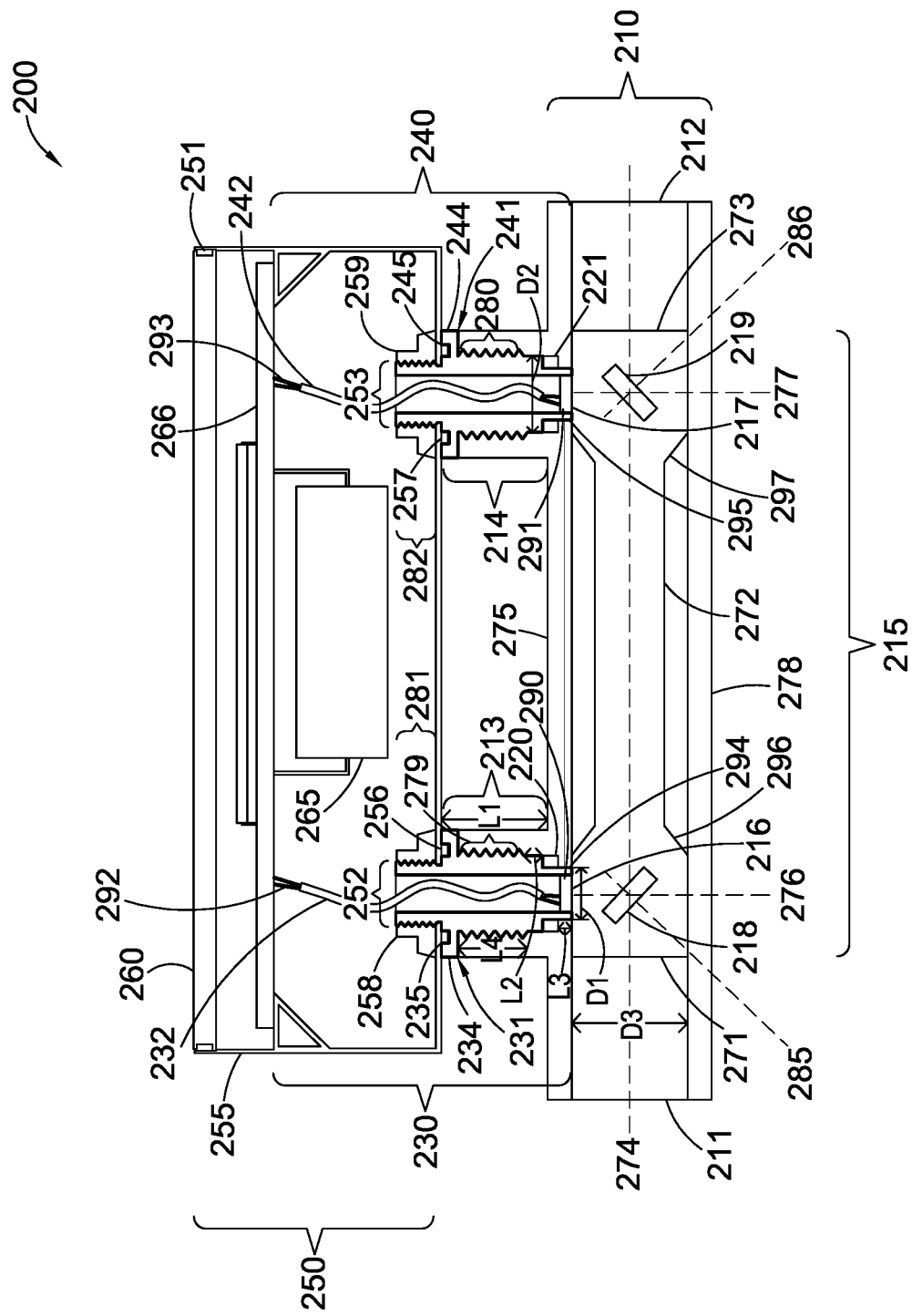
FIG. 2 shows a cross section of a flow meter assembly.

FIG. 2 shows a flow meter assembly 200. The flow meter assembly 200 includes a flow tube 210, a first sensor 230, a second sensor 240 and a housing 250. Each of the flow tube 210, the first sensor 230, the second sensor 240 and the housing 250 will now be described in more detail.

The flow tube 210 is a hollow, generally cylindrical section. In this example, the longitudinal axis 274 of the flow tube 210 is horizontally orientated. The flow tube 210 has an inlet 211, an outlet 212, a first port 213 and a second port 214. The inlet 211 and the outlet 212 define disparate ends of the flow tube 210. The first port 213 and the second port 214 are hollow, generally cylindrical sections which extend from an upper surface 275 of the flow tube 210. In this example, the longitudinal axes 276, 277 of the first port 213 and the second port 214 respectively are vertically orientated. Consequently, the longitudinal axes 276, 277 of the first port 213 and the second port 214 are perpendicular to a plane which extends horizontally along the upper surface 275 of the flow tube 210. The first 213 and second 214 ports extend normal to the upper surface 275 of the flow tube 210 for a distance L1. L1 may be approximately one quarter of the length of the flow tube 210. The first port 213 and the second port 214 are located between the inlet 211 and the outlet 212. The first port 213 is arranged approximately midway between the inlet 211 and the mid-point of the flow tube 210 (by length). The second port 214 is arranged approximately midway between the mid-point of the flow tube 210 (by length) and the outlet 212.

Although in this example, each of the first 213 and second 214 ports is orientated in the same way with respect to the flow tube 210 as the other. In alternative arrangements, the first 213 and second 214 ports may be orientated differently with respect to the flow tube 210 than the other.

Other arrangements are also possible, as will occur to the skilled person. For example, alternatively or additionally, each of the first port 213 and the second port 214 may extend from any surface of the flow tube 210. For example, the first port 213 and/or the second port 214 may extend from a lower surface 278 of the flow tube 210. In this case, the longitudinal axis 276, 277 of the first port 213 and/or the second port 214 is still vertically orientated. Alternatively, or additionally, the longitudinal axes 276, 277 of each of the first port 213 and the second port 214 may be at any angle to a plane which extends along the surface of the flow tube 210 from which the first 213 and second 214 ports respectively extend. Additionally, or alternatively, the flow tube 210 and the first 213 and second 214 ports may be rotated in space. For example, the flow tube 210 may be rotated such that it is vertically orientated. When rotated, the relative orientations of the components in the assembly 200 may remain the same as previously described.

Returning to FIG. 2, the size and shape of the first 213 and second 214 ports are substantially the same as each other. The internal diameter of the first 213 and second 214 ports varies along the longitudinal length of the first 213 and second 214 ports in a way in which will now be described. The internal diameter at the end of the first 213 and second 214 ports which is closest to the upper surface 275 of the flow tube is the smallest internal diameter. This will be referred to as the first diameter D1. After a relatively short section L3 at the first diameter D1, the internal diameter changes to a second diameter D2. D2 is larger than the first diameter D1. The increase between the first diameter D1 and the second diameter D2 creates a respective ledge 220, 221 inside each of the first 213 and second 214 ports. The second diameter D2 is maintained for a further relatively short section L2. The further relatively short section L2 is longer than the relatively short section L3. After the relatively short section L2, the internal surface of each of the first 213 and second 214 ports is screw threaded for a length L4. These will be referred to as screw threaded sections 279, 280. The screw threaded sections 279, 280 extend in the longitudinal direction of the port for approximately as long as the short section L3 and the relatively short section L2 combined. L4 is therefore equivalent to approximately L3 and L2 combined. The external diameter of the first 213 and second 214 ports is constant and may be approximately the same as the internal diameter D3 of the flow tube 210.

In short, the size and shape of each of the first 213 and second 214 ports is chosen to match the design of the first 230 and second 240 sensors, respectively. This relationship will be described in more detail below in reference to the sensors 230, 240. Most particularly, the threading on the screw threaded sections 279, 280 of each of the first 213 and second 214 ports is designed to match the screw threading on the outside of the first 230 and second 240 sensors, respectively. In this way the sensors 230, 240 may fasten to the ports 213, 214 of the flow tube 210.

Returning to the description of the flow tube 210, the flow tube 210 accommodates a measurement tube 215. The measurement tube 215 is arranged to increase the velocity of the fluid in the flow tube 210. The measurement tube 215 increases the velocity of the fluid by forcing the fluid in the flow tube 210 to pass through its main portion, which has a generally smaller diameter than the flow tube 210. The main portion is described in more detail below. Furthermore, the measurement tube 215 is arranged such that the flow rate measurements are calculated based on the faster flowing fluid. Advantageously, this results in more accurate results than if the measurements were based on slower flowing fluid.

The measurement tube 215 is a hollow, cylindrical tube which extends within the flow tube 210. The measurement tube 215 has a measurement tube inlet 271, a main portion 272 (as referred to above) and a measurement tube outlet 273. The internal diameter of the main portion 272 is smaller than that of the flow tube 210. The main portion 272 extends within the flow tube 210 between the first 213 and second 214 ports. The measurement tube inlet 271 extends within the flow tube 210 from the edge of the main portion 272 closest to the first port 213 to the other side of the first port 213. The measurement tube outlet 273 extends from the edge of the main portion 272 closest to the second port 214 to the other side of the second port 214. The lengths of each of the measurement tube inlet 271 and outlet 273 are therefore approximately the same as the external diameter of the first 213 and second 214 ports.

The internal diameters of each of the measurement tube inlet 271 and outlet 272 increase rapidly 296, 297 from the internal diameter of the main portion 272 at respective edges of the main portion 272 to the internal diameter of the flow tube 210. As a result, a seal is formed between the measurement tube 215 and the flow tube 210 such that, in use, all fluid flowing in the flow tube 210 is forced to flow through the measurement tube 215.

In this example, the measurement tube 215 is designed to press fit into the flow tube 210. In other examples, the measurement tube 215 may be attached to the flow tube 210 in other means which will be apparent to the skilled person. For example, attachment means (not shown) may be used to attach the measurement tube 215 to the flow tube 210. Attachment means may include adhesives. Additionally, or alternatively, sealing means (not shown), such as gaskets, may be used to provide seals between the measurement tube 215 and the flow tube 210.

Returning to the measurement tube inlet 271 and outlet 272, the measurement tube inlet 271 and outlet 272 have first 216 and second 217 apertures, respectively. The apertures 216, 217 line up with the first 213 and second 214 ports, respectively. Consequently, when extrapolated, the longitudinal axes 276, 277 of each of the first 213 and second 214 ports go through the centre of the first 216 and second 217 apertures, respectively. The first 216 and second 217 apertures each have substantially the same diameter as the second diameter D2 of the first 213 and second 214 ports. As the skilled person will appreciate however, in other arrangements, the diameters of the first 216 and second 217 apertures may be different to the second diameter D2 of the first 213 and second 214 ports.

Returning to the measurement tube 215, the measurement tube 215 further includes first 218 and second 219 reflectors. In this example, the first 218 and second 219 reflectors are square shaped surfaces. As will be more discussed in greater detail below, the reflectors are used to reflect ultrasonic waves in the measurement tube 215. In other arrangements, the first 218 and second 219 reflectors are not square shaped, but may be any other shape or design suitable for reflecting ultrasonic waves. In this example, the axis 285 which runs through the centre of the first reflector 218 and which is perpendicular to the first reflector 218 is orientated at 45 degrees clockwise from the longitudinal axis 276 of the first port 213. The axis 286 which runs through the centre of the second reflector 219 and which is perpendicular to the second reflector 219 is orientated at 45 degrees anticlockwise from the longitudinal axis 277 of the second port 214. In this way, the first 218 and second 219 reflectors are inclined towards each other. The axes 285, 286 which each run through the centres of, and which are perpendicular to, the first 218 and second 219 reflectors respectively are coplanar with the longitudinal axis 274 of the flow tube 210. In other words, although the first 218 and second 219 reflectors are tilted towards one another, they are not tilted towards either of the sides of the flow tube 210.

Now turning to the housing 250, the housing 250 includes a first portion 255, which in this arrangement can be considered as a can 255; and a second portion 260, which in this arrangement can be considered as a lid 260. In this example, the lid 260 is made of reinforced glass. Usefully, this allows a line of sight into the housing 250. In other arrangements, the lid 260 may be made from an alternative transparent material. Alternatively, the lid 260 may be made from a non-transparent material. The can 255 may be made from a metal, such as copper; an alloy, such as stainless steel; or a composite. The can 255 may be a hollow cylinder which is open at one end and which is substantially closed at the other. The lid 260 may be a short hollow cylinder which is likewise open at one end and closed at the other. The diameters of the can 255 and the lid 260 are so matched that the open end of the lid 260 may be press fitted on top of the open end of the can 255. A lid gasket 251 provides a water and ingress tight fit between the can 255 and the lid 260. In this example, the lid gasket 251 is made of rubber. Alternatively, the lid gasket 251 may be made from an alternative elastomer material.

Figure 4:
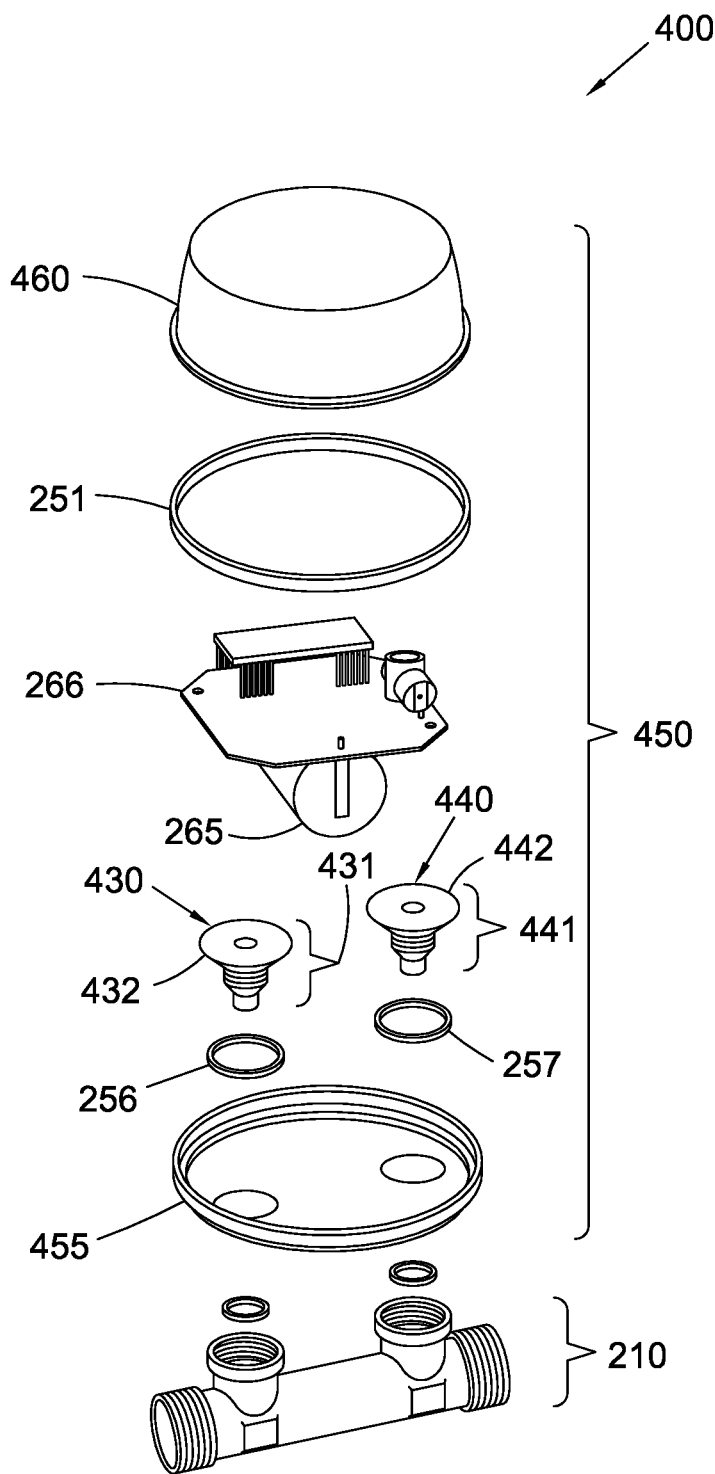
FIG. 4 shows an exploded perspective view of an alternative flow meter assembly.

In short, the can 255 and the lid 260 as so designed as to fit together to form a housing. As the skilled person will appreciate, the can 255 and the lid 260 need not be as described. For example, the can 255 and lid 260 need not be cylindrical: they may be rectangular, hexagonal, oval, or any other suitable size or shape provided they can fit together to form a housing. Furthermore, although the can 255 has in this case been described as being deeper than the lid 260, the relative depths of the can 255 and the lid 260 may be different to that described. For example, the lid 260 may be deeper than the can 255, as shown in FIG. 4. Further, the lid 260 and the can 255 may be the same depth as each other. In short, the precise dimensions of the can 255 and 260 may be different to those described in this disclosure.

The can 255 will now be described in more detail. The can 255 has a first can aperture 252 and a second can aperture 253 in its base. In this case, the can 255 is symmetrical about a plane which extends perpendicular to the base of the can and through the centres of the first 252 and second 253 can apertures. In this way, the first 252 and second 253 apertures are provided centrally in the bottom of the can 255; however, in other arrangements, the first 252 and second 253 apertures need not be provided in this way. For example, the first 252 and second 253 apertures may be provided off centre such that the can 255 is no longer symmetrical about a plane extending perpendicular to the base of the can and through the centres of the first 252 and second 253 can apertures. In use, the first 252 and second 253 can apertures are lined up with the first 213 and second 214 ports, respectively. In use, when extrapolated, the longitudinal axes 276, 277 of each of the first 213 and second 214 ports go through the centres of the first 252 and second 253 can apertures, respectively.

The housing 250 will now be described in more detail. The housing 250 houses batteries 265 and signal converting means 266. The housing 250 may also house desiccant for absorbing any moisture in the housing 250. The batteries are electrically coupled to the signal converting means 266. The signal converting means 266 are electrically coupled to the first 230 and second 240 sensors. The batteries can be any battery or combination of batteries which have the capacity to power the signal converting means 266 (and therefore the first 230 and second 240 sensors) for 20 years or more. The signal converting means 266 includes a printed circuit board (PCB), a processor, a memory and a communication module. The processor, the memory and the communication module are arranged on a PCB. The memory includes instructions which are executable by the processor to run or operate the meter assembly 200 to determine the flow rate of the fluid in the flow tube 210. The operation of the meter assembly 200 is discussed in more detail below.

In other examples, the housing 250 may comprise alternative or additional components as will occur to the skilled person.

Now turning to the first 230 and second 240 sensors, in this arrangement, the first 230 and second 240 sensors are structurally the same. The first 230 and the second 240 sensors are ultrasonic transducers. Consequently, the first 230 and second 240 sensors are arranged to convert electrical signals into ultrasound, and to convert ultrasound into electrical signals.

In this arrangement, the first sensor 230 is a transmitter and the second sensor 240 is a receiver. A transmitter is arranged to convert electrical signals into ultrasound. A receiver is arranged to convert ultrasound into electrical signals. However, in other arrangements, the first sensor 230 may be a receiver and the second sensor 240 may be a transmitter. Alternatively, or additionally, one or both of the sensors 230, 240 may be a transceiver. A transceiver may be suitable both for converting electrical signals into ultrasound, and for converting ultrasound into electrical signals.

Returning to the assembly 200, each of the first 230 and second 240 sensors comprises: a respective sensor body 231, 241; and respective sensing means 232, 242. The sensor bodies 231, 241 are each arranged to protect their respective sensing means 232, 242 and to secure the housing 250 to the flow tube 210. The sensor bodies 231, 241 are shown in bold in FIG. 2.

Each of the sensing means 232, 242 comprises a respective piezoelectric element 290, 291 and a respective wire 292, 293. Each of the piezoelectric elements 290, 291 is electrically coupled to its respective wire 292, 293. The sensing means 232, 242 are the active parts of the sensors 230, 240. By active parts it is meant the parts of the sensors 230, 240 which are active in the conversion of electrical signals into ultrasound, and the reverse. In contrast, the sensor bodies 231, 241 are a passive part of the sensors 230, 240. In this example, the wires 292, 293 extend vertically relative to the flow tube 210. One end of each of the wires 292, 293 is electrically coupled to the signal converting means 266. The other end of each of the wires 292, 293 is electrically coupled to its respective piezoelectric element 290, 291. In other arrangements, the wires 292, 293 may not extend vertically relative to the flow tube 210.

The sensor bodies 231, 241 are each arranged circumferentially around respective sensing means 232, 242. In this example, the sensor bodies 231, 241 each extend from the lower end of their respective sensing means 232, 242 to approximately mid-way up the length of their respective sensing means 232, 242. However, other arrangements are possible, such as those where the top ends of the sensor bodies 231, 241 are each respectively flush with respective top ends of the sensing means 232, 242. In this example, each of the sensor bodies 231, 241 is each attached to their respective sensing means 232, 242 by adhesive. Adhesive may be glue, for example. Alternatively, each of the sensor bodies 231, 241 is attached to their respective sensing means 232, 242 by welding.

The first sensor 230 is located inside the first port 213 of the flow tube 210 and extends into the flow tube 210 such that a first end 294 of the first sensor 230 is flush with the first aperture 216 in the measurement tube 215. However, other arrangements are possible where the first end 294 of the first sensor 230 is not flush with the first aperture 216. For example, the first end 294 of the first sensor 230 may extend beyond the first aperture 216 and into the measurement tube 215. Alternatively, the first end 294 may stop short of the first aperture 216. The piezoelectric element 290 of the first sensor 230 is arranged at the first end 294 of the first sensor 230. The external diameter of the first sensor 230 at its first end 294 is substantially the same as the internal diameter of the first aperture 216. In this way, the first end 294 of the first sensor 230 substantially fully occupies the first aperture 216. Similarly, the second sensor 240 is located inside the second port 214 of the flow tube 210 and extends into the flow tube 210 such that a first end 295 of the second sensor 240 is flush with the second aperture 217 in the measurement tube 215. However, as for the first sensor 120, other arrangements are possible where the first end 295 of the second sensor 240 is not flush with the second aperture 217. For example, the first end 295 of the second sensor 240 may extend beyond the second aperture 217 and into the measurement tube 215. Alternatively, the first end 295 may stop short of the second aperture 217. The piezoelectric element 291 of the second sensor 240 is arranged at the first end 295 of the second sensor 240. The external diameter of the second sensor 240 at its first end 295 is substantially the same as the internal diameter of the second aperture 216. In this way, the second sensor 240 substantially fully occupies the second aperture 217.

The external diameters of the sensor bodies 231, 241—and therefore the sensors 230, 240 overall—vary along their lengths in a way which is complementary to: the internal diameters of the first 213 and second 214 ports; the internal diameters of the first 216 and second 217 apertures; and the internal diameters of the first and second can apertures 252, 253. These relationships will now be described in more detail.

The external diameters of the sensor bodies 231, 241 at their first ends (294, 295) are substantially the same as the internal diameters of the first and second apertures 216, 217, respectively. This diameter is equivalent to approximately the first diameter D1. The external diameter D1 is maintained for each of the sensor bodies 231, 241 for the relatively short length L1 to compliment the internal diameters of the first 213 and second 214 ports. After the relatively short length L3, the external diameters of the first 231 and second 241 bodies increase from the first diameter D1 to the second diameter D2 to compliment the insides of the first 213 and second 214 ports. The second diameter D2 is maintained for the further relatively short length L2. After the relatively short length L2, the external surfaces of the sensor bodies 231, 241 are screw threaded for the length L4 to compliment the screw threaded sections 279, 280 of the first 213 and second 214 ports. The screw threading on the external surfaces of the sensor bodies 231, 241 complements that on the screw threaded sections 279, 280 of the first and second ports 213, 214. After the length L4, the external diameters of the first 231 and second 241 bodies increase to approximately the diameter D3 (approximately the same as the internal diameter of the flow tube 210) to match the external diameters of the first 213 and second 214 ports. After a yet further relatively short length approximately equal to L3 at diameter D3, the diameters of the sensor bodies 231, 241 decrease to approximately the first diameter D2 to define lips 234, 244 which sit on top of the ends of the ports 213, 214 which are furthest from the flow tube 210. Each of the upper sides of the lips has a recess 235, 245 which extends circumferentially about the respective sensing means 232, 242. The final sections 281, 282 of the sensor bodies 231, 241 have screw threading on their external surfaces.

In use, the final sections 281, 282 of the sensor bodies 231, 241 extend through respective first 252 and second 253 can apertures of the can 255. Accordingly, in use the can 255 rests on the lips 234, 244 of the sensor bodies 231, 241. A first housing gasket 256 is loaded into the circumferential recess 235 in the lips of the first sensor body 231. A second housing gasket 257 is loaded into the circumferential recess in the lips 245 of the second sensor body 241. A first nut 258 is threadably fastened to the final screw threaded longitudinal section 281 of the first sensor body 231. A second nut 259 is threadably fastened to the final screw threaded longitudinal section 282 of the second sensor body 241. In this way the sensor bodies 231, 241 fasten the can 255 to the sensor bodies 231, 241, and indeed to the sensors 230, 240. The first and second gaskets 256, 257 provide for water and dirt tight seals between the can 255 and the sensor bodies 231, 241. In this example, the first and second gaskets 256, 257 are made of rubber. Alternatively, each of the first and second gaskets 256, 257 may be made from an alternative elastomer material. The first and second gaskets 256, 257 may be made from the same material; or different materials.

The size and shape of the first and second sensor bodies 231, 241 are therefore such that they complement the size and shape of the flow tube 210 and the size and shape of the housing 250. Advantageously, this means that the first and second sensor bodies 231, 241 can be used to threadably fasten the first and second sensors 230, 240 to the flow tube 210 and to the housing 250. In this way, the first and second sensors 230, 240 are used to fasten the housing 250 to the flow tube 210.

Figure 3:
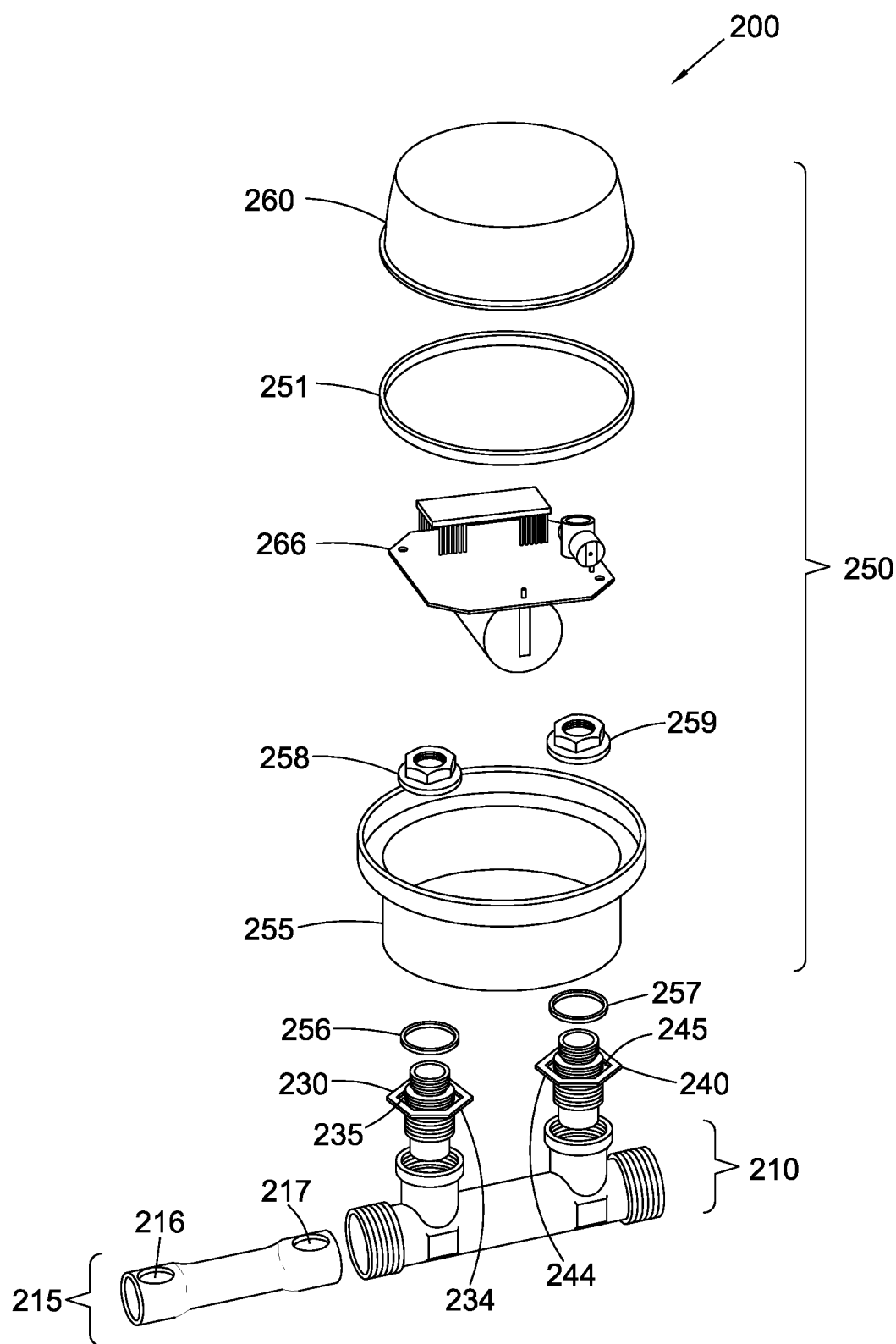
FIG. 3 shows an exploded perspective view of the flow meter assembly.

FIG. 3 shows an exploded perspective view of the flow meter assembly 200. Like reference numerals refer to like parts. FIG. 3 clearly shows how the first and second sensors 230, 240 fasten the housing 250 to the flow tube 210 by acting, in simple terms, at one end as a mechanical screw and, at the other, as a bolt of a nut and bolt combination.

The operation of the flow meter assembly 200 will now be described. In use, the processor executes instructions in the memory to generate and apply a first input signal to the first sensing means 232 and a second input signal to the second sensing means 242. The first and second input signals are AC electrical signals. The frequencies of each of the first and second AC electrical signals are substantially the same as the resonant frequencies of the piezoelectric elements 290, 291 in the first and second sensing means 232, 242, respectively. This causes each of the piezoelectric elements 290, 291 to resonate and generate first and second ultrasonic waves, respectively. In this example, the first and second input signals are generated and applied at substantially the same time, however—in other examples—the first and second input signals may be generated and applied at different times.

The first ultrasonic waves are emitted from the first end 294 of the first sensor 230. The second ultrasonic waves are emitted from the first end 295 of the second sensor 240. Each of the first and second ultrasonic waves penetrate the first sensor 230 and second sensor 240, respectively, and enter the fluid flowing in the fluid tube 210.

More specifically, the first and second ultrasonic waves enter the fluid flowing in the measurement tube 215. As a result, the first ultrasonic waves are reflected by the first reflector 218 towards the second reflector 219 and the second ultrasonic waves are reflected by the second reflector 219 towards the first reflector 218. Once the first ultrasonic waves arrive at the second reflector 219, the first ultrasonic waves are reflected by the second reflector 219 towards the lower surface of the second sensor 240. Once the second ultrasonic waves arrive at the first reflector 218, the second ultrasonic waves are reflected by the first reflector 218 towards the lower surface of the first sensor 230.

The first ultrasonic waves penetrate the second sensor 240 and cause the piezoelectric element 291 in the second sensing means 242 to vibrate. The vibration causes a voltage to be generated between the contacts of the piezoelectric element 291. This results in AC electrical current flowing in the second sensing means 242 as would be understood. This is the first output signal.

Similarly, the second ultrasonic waves penetrate the first sensor 230 and cause the piezoelectric element 290 in the first sensing means 232 to vibrate. The vibration causes a voltage to be generated between the contacts of the piezoelectric element 290. This results in AC electrical current flowing in the first sensing means 232 as would be understood. This is the second output signal.

The processor executes instructions in the memory to receive the first and second output signals. The flow rate of the fluid in the flow tube 210 is then determined based on the first and second input signals and the first and second and output signals, as discussed in more detail below.

In short, the flow rate of the fluid in the flow tube 210 is measured from the transmit time of the first and second ultrasonic waves in the flow tube 210. In other words, the processor measures the difference between the transmit time of the ultrasonic wave propagating in the flow direction and the transmit time of the ultrasonic wave propagating against the flow direction. In more detail, the processor:

(a) compares the time at which the first ultrasonic waves were emitted from the first sensor 230 with the time at which the first ultrasonic waves were received at the second sensor 240 to determine the transit time in a first flow direction;

(b) compares the time at which the second ultrasonic waves were emitted from the second sensor 240 with the time at which the second ultrasonic waves were received at the first sensor 230 to determine the transit time in a second flow direction;

(c) compares the transmit time in the first flow direction with the transit time in the second flow direction to determine the average velocity of the fluid along the path of the ultrasonic waves—that is, the average velocity of the fluid in the flow tube 210; and (d) multiplies the average velocity of the fluid with the cross-sectional area of the flow tube 210 to determine the flow rate of the fluid in the flow tube 210.

Some of the technical advantages of the flow meter assembly 200 will now be described.

A less complex way of attaching the meter housing—that is, the dry cavity—to the flow tube is provided. This is by virtue of using the sensors to fasten the housing to the flow tube without additional fastening means. This leads to advantages such as fewer overall parts, which reduces manufacture, assembly and installation costs, times and complexities.

Reduced likelihood of leakage from the flow tube is provided. This is by virtue of there being fewer holes in the flow tube, which reduces the likelihood of leaks from the flow tube. In turn, this minimises the likelihood of water entering the housing.

More robust positioning of the sensors is provided. This results in improved accuracy on where exactly the sensors are located, which results in more accurate results for the flow rate of the fluid. The more robust positioning of the sensors is achieved by virtue of their threadable engagement with the flow tube. This results in a strong relationship between the sensors and the flow tube such that it is unlikely that the sensor will be dislodged—that is, move—relative to the flow tube. Accordingly, the position of the sensors can be known with improved accuracy.

In summary, the sensors are used to sealably fasten the housing to the flow tube which results in reduced costs; a less complex assembly; reduced likelihood of leakages; and improved performance of the meter. Accordingly, not only is a flow meter assembly provided which is capable of meeting the IP68 standards for the desired 20 year period, but a generally superior flow meter is provided.

Alternative Flow Meter Assembly

An alternative flow meter assembly will now be described in reference to FIG. 4.

FIG. 4 shows an exploded perspective view of an alternative flow meter assembly 400. As before, like reference numerals refer to like parts. The operation and the general concept behind the flow meter assembly 400 are generally the same as that of flow meter assembly 200; however there exist differences in the actual implementation of the concepts, as will now be discussed.

The flow meter assembly 400 includes a housing 450, a flow tube 210 and first 430 and second 440 sensors. Each of the housing 450 and the first 430 and second 440 sensors will now be described in more detail. The flow tube 210 is as described in relation to flow meter assembly 200.

The housing 450 includes a shallow can 455 and a deep lid 460. The deep lid 460 press fits to the shallow can 455 in the same way as the can 255 and lid 260 in assembly 200. The shallow can 455 is however shallower than the can 255 and the lid 260 is deeper than the can 255. In this way, in contrast to the flow meter assembly 200, the shallow can 455 provides a base for the housing 450 and the deep lid 460 provides the top and sides of the housing 450. As for the meter assembly 200, a housing gasket 251 is arranged between the deep lid 460 and the shallow can 455 to seal the housing 450 from moisture and dirt ingress. Like the can 255, the shallow can 455 has first and second can apertures 252, 253.

Now looking to the first 430 and second 440 sensors, the first 430 and second 440 sensors include first and second sensing means (not shown) arranged within first 431 and second 441 sensor bodies in the manner described in relation to meter assembly 200. However, in this case, the shape of the sensor bodies 431, 441 is slightly different to that described for meter assembly 200. Consequently, the way the sensor bodies 431, 441 fasten the housing 450 to the flow tube 210 is slightly different to that in assembly 200.

More specifically, in assembly 400, the shallow can 455 sits directly on the ends of the first and second ports 213, 214 furthest from the flow tube 210. In contrast to the assembly 200, in the assembly 400 the sensor bodies 431, 441 are not intermediate the housing 450 and the flow tube 210. The sensor bodies 431, 441 in assembly 400 are generally the same shape as those in assembly 200, however the sensor bodies 431, 441 finish at the top of their respective lips 432, 442. In other words, neither sensor body 431, 441 has the final longitudinal threaded portion. This is because, in assembly 400, the final longitudinal threaded portions are not required because no nuts are needed to fasten the housing 450 to the sensor bodies 431, 441. Instead, the housing 450 is trapped and fastened to the sensor bodies 431, 441 and the flow tube 210 by virtue of being between the lower surfaces of the lips 432, 442 of the sensor bodies 431, 441 and the flow tube 210.

The advantages of the fluid meter assembly 400 are generally the same as those described for the fluid meter assembly 200, with the further advantage that the assembly is yet further simplified for at least the following reasons. Firstly, the design of the sensor bodies 431, 441 is simplified. This results in lower manufacturing costs. Secondly, fewer parts are required since the nuts are no longer required. Again this results in lower manufacturing costs, but also in lower assembly costs.

Alternative Sensor Body Designs

Figure 5A:
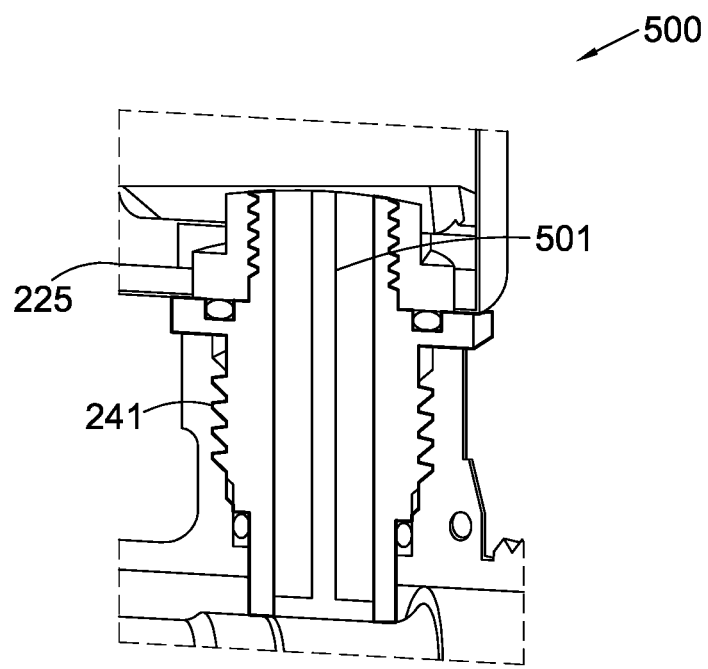
FIGS. 5A to 5C show close up cross sections of alternatives for a part of the flow meter assembly, each cross section being viewed from an angle.
Figure 5B:
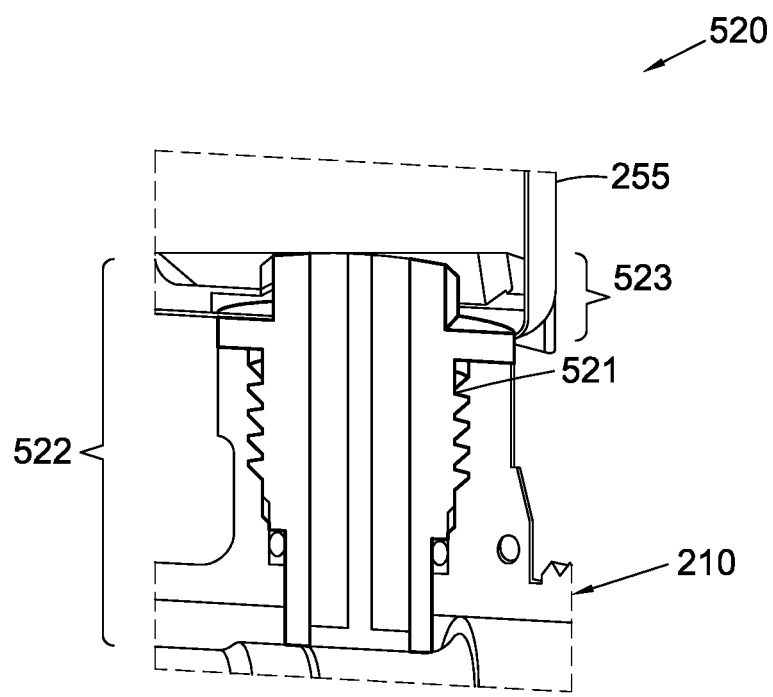
Figure 5C:
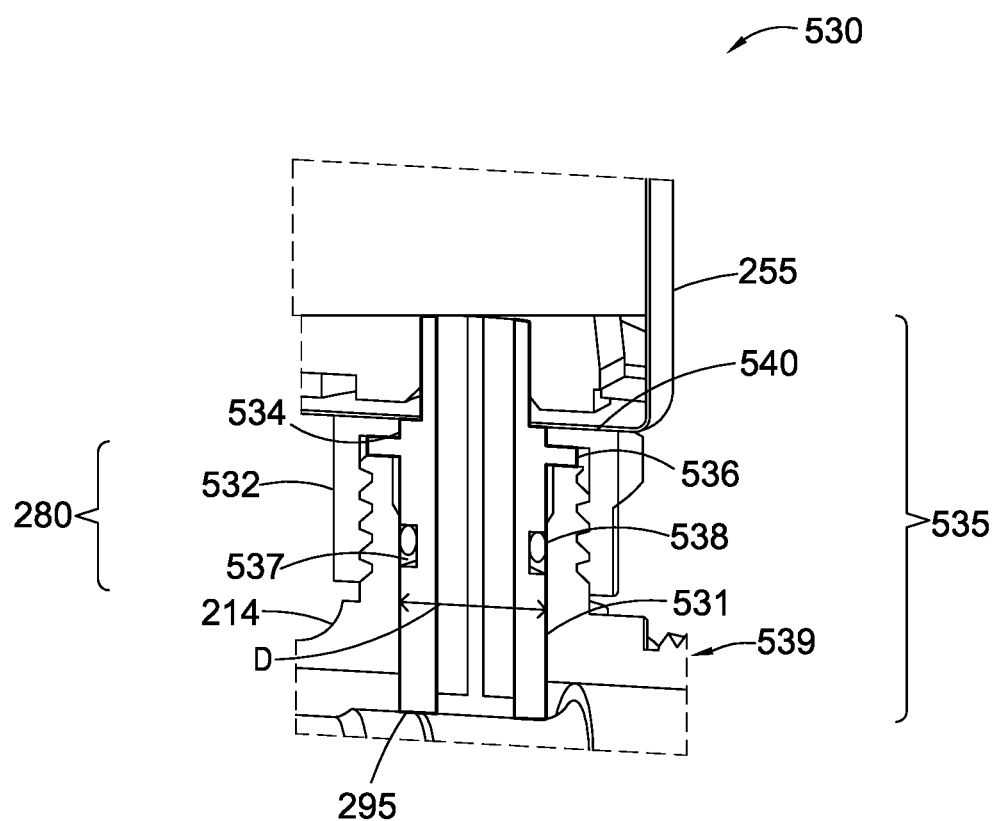

FIGS. 5A to 5C show alternatives for the sensor fastening arrangements of the fluid meter assemblies 200, 400 described in reference to FIGS. 2 to 4. As before, like reference numerals refer to like parts. Although FIGS. 5A to 5C each show only one sensor, it is envisaged that there may be a second sensor of the same style to make up a complete fluid meter assembly.

FIG. 5A shows a sensor arrangement 500 which is similar to that described in reference to FIGS. 2 and 3. The key difference in sensor arrangement 500 is that the sensing means 501 do not extend longitudinally beyond the upper surface of the sensor body 241. Instead, the sensing means 501 and sensor body 241 have approximately equivalent lengths. Consequently, signal converting means (not shown) are arranged on the base of the can 225 so as to be in electrical communication with the sensing means 501. As for FIG. 2, in FIG. 5a the sensor body 241 is shown in bold.

FIG. 5B shows a sensor arrangement 520 in which—unlike the fluid meter assembly 200 described in reference to FIG. 2—the sensor body 521 is welded to the can 255. The sensor body 521 is shown in bold in FIG. 5B. The sensor 522 is fixed to the flow tube 210 in the same manner as previously described—that is, by threadable engagement. The sensor body 521 will now be described in more detail. The sensor body 521 is substantially the same as sensor body 241 but for two key differences:

1. The final section 523 of the sensor body 521 has a plain surface, rather than a threaded surface. This is because the final section 523 is not arranged to be threadably coupled to a nut. In this disclosure, a plain surface may be a substantially smooth surface with no threading. Advantageously, this leads to a less complex sensor body 521 design, which can lead to reduced manufacturing costs.
2. The circumferential recess 245 is not provided in the lips of the sensor body 521 as the housing gasket 257 is not required. This is because the can 255 is intended to be welded to the final section 523 of the sensor body 521 so as to create a sealed coupling between the can 255 and the sensor body 521. Consequently, there is no risk of ingress between the can 255 and the sensor body 521 and so no housing gasket 257 is required. Advantageously, this further reduces the complexity of the sensor body 521 design, which can results in reduced manufacturing costs. Installation may also be simplified since the step of loading the gasket 257 into the recess 245 is avoided.

Various types of welding may be used to weld the can 255 to the sensor body 521 as will occur to the skilled person. In particular, laser welding may be used to weld the can 255 to the sensor body 521. In alternative embodiments, the final section 523 need not be as described, but may be any size and shape suitable for welding to the can 255.

FIG. 5C shows a sensor arrangement 530 in which the surface of the sensor body 531 is substantially plain. The sensor body 531 is shown in bold in FIG. 5C. In use, the sensor body 531 is welded to the can 255, as described in reference to the sensor arrangement 520 of FIG. 5B, and the sensor body 531 is fixed to the flow tube 539 by a nut 532. Advantageously, this results in a much less complex sensor body 531 design which may lead to reduced manufacturing and installation costs and less complex manufacturing and installation processes. The sensor arrangement 530 will not be described in more detail.

The sensor body 531 is substantially the same as the sensor body 521 described in reference to FIG. 5B, but for three key differences:

1. The sensor body 531 is not provided with any screw threading. In other words, the external surface of the sensor body 531 is substantially plain.
2. The lips 536 of the sensor body 531 are provided with a first indent 534. The first indent 534 is provided in the side of the lips which is furthest from the first end 295 of the sensor 535. The first indent 534 extends circumferentially around the lips such that the lips 536 are provided with a step. The first indent 534 is provided for fixing the sensor body 531 to the flow tube 539, as will be described in more detail below.
3. The external diameter D of the sensor body 531 is substantially constant between the first end of the sensor 295 and the lips 536, but for a second indent 537. The second indent 537 extends circumferentially around the sensor body 531 approximately midway between the first end 295 of the sensor 535 and the lips 536. In use, a gasket 538 is loaded into the second indent 537 to prevent ingress between the sensor body 531 and the flow tube 539. The second indent 537 may be positioned anywhere along the length of the sensor body 531 to prevent such ingress.

The flow tube 539 is substantially the same as the flow tube 210 described in reference to FIG. 2 but for one key difference: the screw threaded section 280 of the port 214 is provided on the outside surface of the flow tube 539, not the inside surface of the flow tube 539.

In use, the flow tube 539 is fixed to the sensor body 531 using the nut 532. More specifically, the sensor body 531 is inserted into the port 214 until the lips of the sensor body 531 rest on the end of the port 214 furthest from the flow tube 539. Once in position, the nut 532 is threadably coupled to the screw threaded section 280 of the flow tube 539. The nut 532 is provided with a bracket 540 (an annular lip extending inwards) which occupies the first indent 534 such that the sensor body 531 is thereby fixed to the flow tube 539. The can 255 is weldably coupled to the sensor body 531 in the same manner as described in reference to FIG. 5B.

Advantageously, the sensor arrangement 530 leads to a less complex sensor body design since the surface of the sensor body is substantially plain. Accordingly, manufacturing costs may be reduced. Furthermore, installation costs may be reduced because installation is made far simpler since neither the sensor body 531 nor the flow tube 539 need to be rotated with respect to each other; instead, only the nut 532 need by rotated, which is a far simpler installation task.

As will occur to the skilled person, any combination of the features of the various sensor body designs described in this disclosure may be combined in a further combination provided that the sensor body still plays a role in fixing the housing to the flow tube.

Alternative Sensing Means

According to alternative arrangements, the sensors (and, particularly, the sensing means) may utilise electromagnetic technologies, rather than ultrasonic technologies, to measure the flow rate of the fluid in the flow tube. For example, the sensors might be magnetic flow meters.

In some arrangements, the first sensor may be one of a transmitter or a receiver and the second sensor may be the other of a transmitter or receiver.

In some arrangements, one or both of the first and second sensors may be a transceiver.

Sensor Body

Although the first 231 and second 241 sensor bodies of meter assembly 200 described in reference to FIG. 2 are described as having threading on their external surfaces, in alternative arrangements, the sensor bodies may each comprise a further, integral or modular, portion. In this case, each further portion may be provided with threading on its internal surface for mating with corresponding threading on the external surfaces of the first 213 and second 214 ports, respectively. Examples of such an arrangement are shown and described above in reference to FIG. 5C.

Power Supply

Additionally, or alternatively, the flow meter assemblies may have a wired power supply. This may be additional to, or instead of, batteries within the meter housing.

Accessibility

In some arrangements, the flow meter assembly may be inaccessible to a user. For example, the meter may be buried underground, or located somewhere difficult and potentially unsafe to reach. In other arrangements, the flow meter assembly may be easily accessible to the user.

Regardless of whether the flow meter is accessible or inaccessible, usefully the user can utilise the communications means provided in the housing to read the determined flow rate results from a location remote to the flow meter assembly. More specifically, the user may poll the communication means over one or more wireless or wired networks and request that the communication means sends a message indicative of the determined flow rate over the, or a different, wireless or wired network. Examples of wireless networks include: Bluetooth, infrared, radio, ZigBee and/or Wi-Fi. Alternatively, or additionally, rather than waiting to be polled, the communication means may send a message over one or more wireless or wired networks to a user on a periodic basis—such as once every hour; and/or when a transient event occurs—such as when the flow rate drops below a certain level.

Where it is possible without apparent technical incompatibility, features of different arrangements, embodiments or aspects disclosed herein may be combined with some features optionally being omitted.

Manufacture

Methods of manufacturing some of the components of this disclosure will now be described. Examples of materials from which some of the components may be made will also be described.

Starting with the fluid carrying components: each of the flow tubes and measurement tubes may be made from any material which is suitable for containing a fluid. For example, one or more of the flow tubes and measurement tubes may be made from: a composite material; a metal; or a metal alloy, such as brass or stainless steel. The methods used to manufacture the flow tubes and measurement tubes will depend on the materials from which they are made. Examples of possible manufacturing techniques include injection moulding; forging; or lost-wax casting.

Looking next at the can and lid arrangement, the cans may be made from metallic or non-metallic materials. Examples of suitable materials for the cans include: stainless steel, copper and composite materials. The lids may be made from transparent or non-transparent materials. Examples of suitable materials for the lids include: glass, reinforced class, clear plastic or any transparent composite.

Looking finally at the gaskets and nuts of this disclosure, the gaskets of this disclosure may be made from any elastomer material, such as rubber. The nuts may be made from metallic or non-metallic materials. Examples of suitable materials include: stainless steel, brass or composite materials.

The invention claimed is:

1. A sensor for measuring a flow rate of a fluid in a flow tube, the sensor comprising sensing means and a sensor body, wherein:
   a portion of the sensing means is located within the sensor body; and
   a first portion of the sensor body is threaded and is arranged to threadably fasten the sensor body to the flow tube such that the sensor is positioned for sensing the flow rate of the fluid in the flow tube.

2. The sensor of claim 1, wherein the first portion of the sensor body is arranged to sealably fasten the sensor body to the flow tube.

3. The sensor of claim 1, wherein the sensor body is arranged to fasten to a housing.

4. The sensor of claim 1, wherein signal converting means are arranged to apply an input signal to the sensing means and receive an output signal from the sensing means.

5. The sensor of claim 4, wherein the signal converting means are arranged to determine the flow rate of the fluid in the flow tube based on the input signal and the output signal.

6. The sensor of claim 1, wherein the sensor is positioned for sensing the flow rate of the fluid in a measurement tube arranged within the flow tube.

7. A method of manufacturing the sensor of claim 1, the method comprising:
   providing the sensor body and the sensing means.

8. A flow tube for transporting a fluid, the flow tube comprising:
   an inlet;
   an outlet; and
   a connection point, wherein a portion of the connection point is threaded and the portion of the connection point is arranged to threadably fasten the flow tube to a sensor for measuring a flow rate of the fluid in the flow tube such that the sensor is positioned for sensing the flow rate of the fluid in the flow tube.

9. The flow tube of claim 8, wherein the portion of the connection point is arranged to sealably fasten the flow tube to the sensor.

10. The flow tube of claim 8, further comprising a measurement tube, wherein the measurement tube is arranged within the flow tube and wherein the measurement tube is arranged to increase velocity of the fluid in the flow tube.

11. The flow tube of claim 10, wherein the measurement tube comprises a reflector and wherein the reflector is arranged is direct a signal towards or away from the sensor.

12. A method of manufacturing the flow tube of claim 8.

13. A method of assembling a flow meter assembly for measuring a flow rate of a fluid, the assembly comprising:
   a flow tube for transporting the fluid, the flow tube having an inlet, an outlet and a connection point; and
   a sensor for measuring the flow rate of the fluid, the sensor having sensing means and a sensor body, wherein a portion of the sensor body is threaded and a portion of the connection point is threaded, and wherein the portion of the sensor body and the portion of the connection point are arranged to threadably fasten the sensor body and the flow tube to each other such that the sensor is positioned for sensing the flow rate of the fluid in the flow tube; and
   wherein the method comprises the step of:
      threadably fastening the portion of the sensor and the portion of the connection point to each other.

14. The sensor of claim 1, further comprising a measurement tube, wherein the measurement tube is arranged within the flow tube and wherein the measurement tube is arranged to increase velocity of the fluid in the flow tube.

15. The sensor of claim 14, wherein the measurement tube comprises a reflector and wherein the reflector is arranged to direct a signal towards or away from the sensor.

16. The flow tube of claim 8, wherein the sensor is positioned for sensing the flow rate of the fluid in a measurement tube arranged within the flow tube.

* * * * *